(12) United States Patent
Daleen et al.

(10) Patent No.: US 6,493,722 B1
(45) Date of Patent: Dec. 10, 2002

(54) BILLING SYSTEM FOR DISTRIBUTING THIRD PARTY MESSAGES TO FORM A COMMUNITY OF SUBSCRIBERS TO NEGOTIATE A GROUP PURCHASE FROM THE THIRD PARTY

(75) Inventors: James Daleen; John Z. Yin, both of Boca Raton, FL (US)

(73) Assignee: Daleen Technologies, Inc., Boca Raton, FL (US)

( * ) Notice: Subject to any disclaimer, the term of this patent is extended or adjusted under 35 U.S.C. 154(b) by 0 days.

(21) Appl. No.: 09/290,804

(22) Filed: Apr. 13, 1999

(51) Int. Cl.[7] .............................................. G06F 17/30
(52) U.S. Cl. ........................... 707/104.1; 707/10; 707/3
(58) Field of Search ............................. 707/3, 104, 10, 707/14, 104.1, 102, 101, 200, 203; 709/219; 455/419

(56) References Cited

U.S. PATENT DOCUMENTS

| | | | |
|---|---|---|---|
| 5,243,550 A | * | 9/1993 | Canizzaro .............. 364/710.13 |
| 5,524,135 A | * | 6/1996 | Mizikovsky et al. ......... 379/58 |
| 5,717,923 A | * | 2/1998 | Dedrick |
| 5,794,210 A | * | 8/1998 | Goldhaber et al. ........... 705/14 |
| 5,864,871 A | * | 1/1999 | Kitain et al. ................ 707/104 |
| 5,915,093 A | * | 6/1999 | Berlin et al. ........... 395/200.49 |
| 5,958,016 A | * | 9/1999 | Chang et al. ............... 709/229 |
| 6,055,567 A | * | 4/2000 | Ganesan et al. ............ 709/219 |
| 6,064,723 A | * | 5/2000 | Cohn et al. .............. 379/88.14 |
| 6,125,388 A | * | 9/2000 | Reisman ..................... 709/218 |
| 6,298,348 B1 | * | 10/2001 | Eldering ...................... 707/10 |

* cited by examiner

Primary Examiner—Jean M. Corrielus
Assistant Examiner—Tam V Nguyen
(74) Attorney, Agent, or Firm—Jon A. Gibbons; Fleit, Kain, Gibbons, Gutman & Bongini P.L.

(57) ABSTRACT

A system, a method and a computer readable medium for distributing messages from a third-party to a group of subscribers by using subscriber information and subscriber preferences stored in a database so that the group of subscribers can form a community to negotiate a group purchase of a good and/or service from the third party. A subscriber selection system is used for querying the database using one or more subscriber criteria to form a group of one or more subscribers. The one or more subscriber criteria used to query the database is chosen by the third party, which allows the subscriber selection system to form a group of subscribers who satisfy the criteria for a type of subscriber that the third-party wants to send a message, such as an advertisement, to. A billing system, which is coupled to the database receives one or more messages from a third-party and then provides the one or more messages from the third party to the group of subscribers that was formed by the corresponding query of the database. The present invention allows the messages from the third-party to be distributed to the group of subscribers without revealing to the third party any of the potentially valuable or sensitive subscriber information stored in the database. In other words, all that a third-party knows is that its message is being sent to a group of subscriber who meet the criteria which the third-party selected. The message includes a contact address which is sent along to the subscribers in the group to form a community for pup purchasing of a good and/or service from a third party. The group of subscribers formed are sent the contact address with the messages received from the third party. The group purchase allows individuals and businesses to reduce costs by buying items in quantities.

52 Claims, 6 Drawing Sheets

BILLING SYSTEM FOR DISTRIBUTING THIRD PARTY MESSAGES TO FORM A COMMUNITY OF SUBSCRIBERS TO NEGOTIATE A GROUP PURCHASE FROM THE THIRD PARTY

CROSS-REFERENCE TO RELATED APPLICATIONS

Not applicable

BACKGROUND OF THE INVENTION

1. Field of the Invention

The invention disclosed broadly relates to the field of billing systems, and more particularly relates to the field of electronic billing for customer services.

2. Description of the Related Art

The use of networks and network computers continues to grow. One recent development is the Internet and of the World Wide Web ("Web"). The Web has become immensely popular largely because of the ease of finding information and the user-friendliness of today's browsers. A feature known as hypertext allows a user to access information from one Web page to another Web page by simply pointing with a mouse or equivalent pointing device at the hypertext and clicking. Another feature that makes the Web attractive is having the ability to process the information in remote Web pages without the requirement of having a specialized application program for each kind of content accessed. Thus, the same content is viewed across different platforms. Browser technology has evolved to enable the running of applications that manipulate this content across a wide variety of different platforms. Networks using Web browser servers and technologies for use inside organizations and corporations, called Intranets have also grown in use.

One of the benefits of the Internet has been the possibility of distributing personally tailored information to an individual user. This is an important advancement from the broadcast TV and radio where the information is customized to groups of people usually based on audience demographics and not individually tailored. Internet services such as InfoBeat or PointCast, allow users to provide his/her preferences. These preferences include the types of news and market information desired. Only the news and market information matching the user's preference is delivered. Other portal services, such as Yahoo and MSN (Microsoft Network), allow a user to personalize his/her portal page with information that may be interesting to the user. Such information may include the user's stock portfolio prices, local weather, and favorite sports team scores and more. There also are books and music Internet services that monitor the books and music CDS bought by a user and notify the user about similar books and music. Although these Internet based services are popular, the ability to target specific user preferences still has shortcomings.

One shortcoming of today's services is the very limited ability to share individual user's preferences between different service providers such as between Yahoo and MSN and AOL (America Online) and other third party providers. One method service providers, such as AOL, use to share information with other providers is to make the entire AOL subscriber database available to all its subscribers. However, this method is very much like a broadcast TV or radio model where no individual information or preferences from an user is available. In the electronic messaging services, many third parties use lists of customers or subscribers to send out information. This "spamming" or unsolicited electronic mail is undesirable to many subscribers. Especially, electronic messages that are not tailored to a user's preferences or demographics. Therefore a need exists to provide a method to share user demographic information and user preferences between the service providers with out the requirement of spamming.

Another method providers of service use to share subscriber or customer information with a third party is to provide or sell its subscriber information to other service providers. However passing customer or subscriber information to a third party is problematic. First, the customer or subscriber may not want the third party to have access to certain preference information, therefore the privacy for each subscriber may be an issue. Secondly, by passing subscriber information to other third parties the information collected by a service provider may be lost to competitors. Subscriber information is a valuable business property of a service provider. The release of this information could jump start a competitor and could undercut the service provider's exclusive ownership of the subscriber information. Third, many service providers wish to leverage the investment they made in their customer database without disclosing the database to competitors. Accordingly, a need exists to provide third parties access to subscriber information and preferences while overcoming these problems.

Another shortcoming for service providers that have established large customer database is not only the inability to leverage the use of their customer database but the inability to track usage of customer database information by a third party. Third parties many times would prefer to pay a premium to have information on customers that respond to messages from the third party instead of paying a bulk mail rate. The third parties are interested in paying for information on the subscribers that actually respond to the third party message, such as an advertisement. Accordingly, a need exists for service providers to provide a method and system to monitor the usage and interest of the subscriber in their advertisement messages.

Still, another shortcoming that exists when sending third party messages to subscribers is the inability for one or more subscribers to collaborate to purchase a service in a group. Many individuals and businesses want to reduce costs by buying items in quantities. If one or more of these individuals or businesses could find out others that are interested in a certain message or advertisement from a third party, these individuals or business could collaborate to buy a service in bulk if possible. For example, it may be cheaper for two small businesses to purchase new computers jointly through a volume discount, where each of the respective businesses alone can not meet the volume discount individually. Accordingly, a need exists to provide subscribers who receive third party advertisement a method and system to collaborate buying efforts.

SUMMARY OF THE INVENTION

Briefly, in accordance with the present invention, a method for distributing messages from a third-party comprising the steps of: storing subscriber information for one or more subscribers in a database; querying the database using a subscriber selection system for subscriber information relating to one or more subscribers; and coupling a billing system to the database for providing bills to one or more subscribers; receiving one or more messages from a third party to the billing system; and providing one or more messages to the subscribers as selected by the subscriber selected system. The message includes a contact address which is sent along to the subscribers in the group to form a community for group purchasing of a good and/or service from a third party. The group of subscribers formed are sent the contact address with the messages received from the third party. The group purchase allows individuals and businesses to reduce costs by buying items in quantities.

In another embodiment, the use of the message by a subscriber is monitored through the use of an address redirector. The third part is billed based on the actual response of usage of the third party message and the database storing subscriber information is updated according to the subscriber's response to the third party message.

In accordance with another embodiment of the present invention, an information processing system and computer readable medium is disclosed for carrying out the above method.

In another embodiment, the use of the message by a subscriber is monitored through the use of an address redirector. The third party is billed based on the actual response of usage of the third party message and the database storing subscriber information is updated according to the subscriber's response to the third party message.

In accordance with another embodiment of the present invention, an information processing system and computer readable medium is disclosed for carrying out the above method for changing client software on a network comprises the steps of:

DETAILED DESCRIPTION OF AN EMBODIMENT

Figure 1:
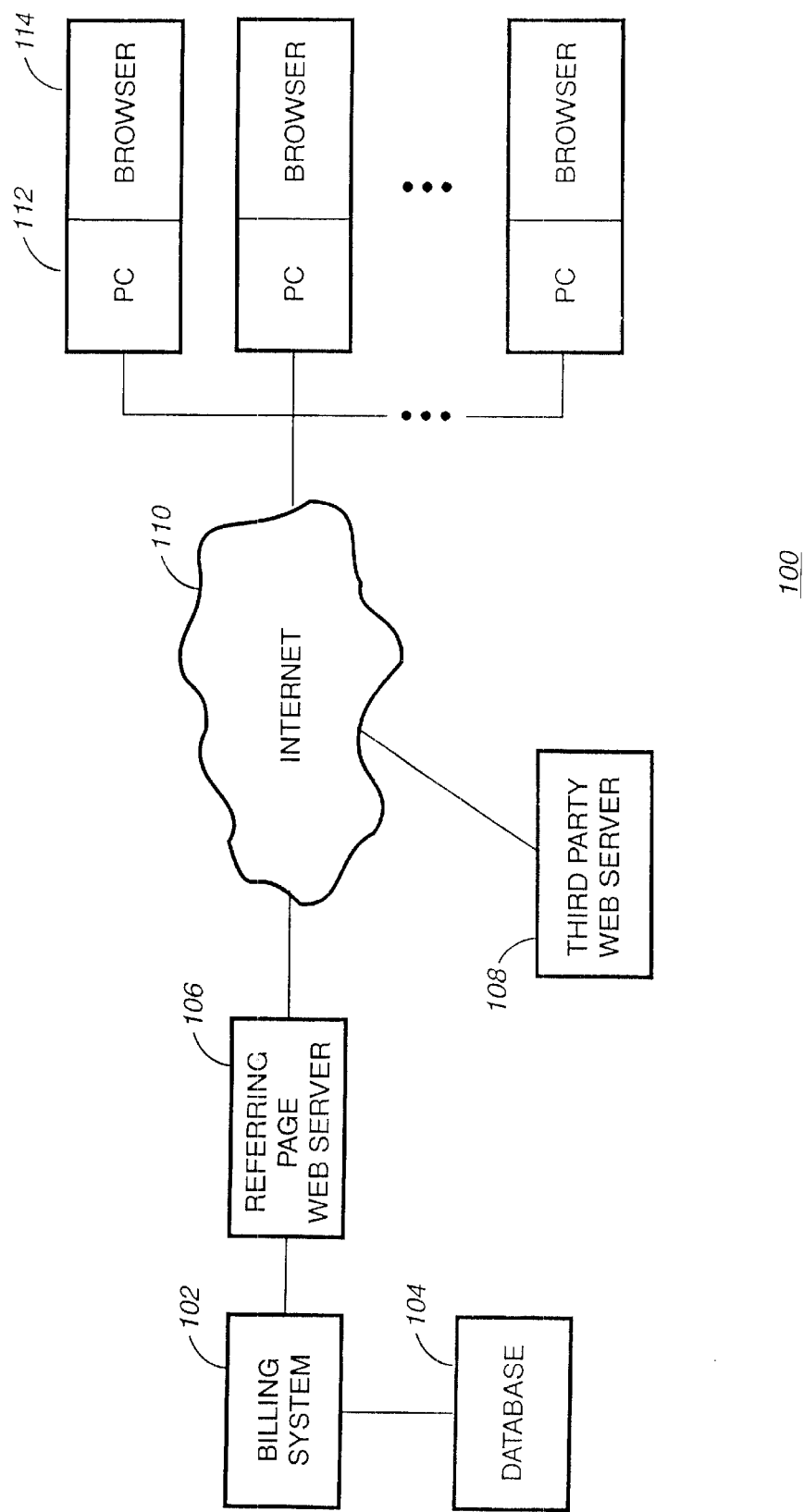
FIG. 1 is a functional block diagram of a computer data network for an electronic billing system according to the present invention.

Glossary of Terms Used in this Disclosure (Capitalized terms are defined within):

Bill—a statement in electronic or printed format that provides information to a Subscriber regarding particular charges for a Service or Services.

Billing System—a system used to calculate charges and request payment from a subscriber or a subscriber's account such as a credit card. Modern Billing Systems also perform may other diversified activities such as service provisioning, credit checks, contract tracking and more. They also hold a wide variety of data such as detailed Subscriber Information, Service information for each Subscriber, account comments and subscriber demographic information.

Community—two or more Subscribers that use on-line collaboration technologies such as forums, chat rooms, and e-mail to share information and interests regarding a Message.

Database—A collection of information organized in such a way that a computer program can quickly select desired pieces of data. People often think of a database as an electronic filing system. Traditional databases are organized by fields, records, and files. A field is a single piece of information; a record is one complete set of fields; and a file is a collection of records. For example, a telephone book is analogous to a file. It contains a list of records, each of which consists of three fields: name, address, and telephone number. An alternative concept in database design is known as hypertext. In a hypertext database, any object, whether it be a piece of text, a picture, or a film, can be linked to any other object. Hypertext databases are particularly useful for organizing large amounts of disparate information, but they are not designed for numerical analysis. A specific implementation of a database may be referred to as a Relational Database.

Message—a text, graphical, audio, video or multimedia communications. Messages include advertisements directed to one or more Subscribers.

Relational Database—a database that requires few assumptions about how data is related or how it will be extracted from the database. As a result, the same database can be viewed in many different ways. An important feature of relational systems is that a single database can be spread across several tables. This differs from flat-file databases, in which each database is self-contained in a single table.

Service—any item including a good, service, money or the movement thereof, that a Subscriber may use. One class of Service is communication services, such as POTs (Plain Old Telephone Service) line, cable line, cellular line, satellite, T1 or TCP/IP connection or equivalent. Another class of Service is utilities such as gas, oil, electric, water, sewer purchased by a Subscriber. Still, another class of Service is transportation such as ticketing, tolls, freight charges, and shipping charges.

Subscriber—a consumer, customer or user of one or more Services that is Billed by the Billing System.

Subscriber Information—one or more pieces of information typically used by a Service provider to Bill a Subscriber. Examples of subscriber information include name, address, telephone number, e-mail address, county, taxing jurisdiction, terms and conditions of the Service and other information directed to the Subscriber.

Subscriber Preferences—one or more pieces of personal information related to a Subscriber which may include purchasing selections, demographics, age, gender, household income, household size, service subscription history, service usage information, race, education, employment, and other information valuable to Third Party providers of Messages.

Third Party—is a party wishing to send a Message to one or more Subscribers listed in a Database coupled to a Billing System.

Usage Collector—a system to track the amount of time or quantity a particular Service that is being used. The information from the Usage Collector is feed into a Billing System to generate a Bill for a subscriber.

Description

Referring now in more detail to the drawings in which like numerals refer to like parts throughout several views, FIG. 1 shows a functional block diagram depicting a computer data network 100 for an electronic billing system according to the present invention. A third party, such as an advertiser, wishing to use the Internet 110 to advertise products has a Web site resident at the third party web page server 108. The third party Web page server 108 and referring page Web page server 106 are connected to the Internet 110. A plurality of end-user systems 112 each with a Web browser 114 are connected to the Internet 110. Web browser 114 comprises client software programs based upon an HTTP (Hyper-Text-Transfer-Protocol) compatible product such as Netscape Navigator, Sun Hot JAVA Browser or Microsoft Internet Explorer. A billing system 102 is coupled to the referring page Web server 106. The billing system is any commercially available billing system 102, such as Daleen Technologies' BillPlex™ brand billing system, Kenan Systems billing systems or Saville Systems billing systems, where the billing system 102 is coupled to a database 104 such as Oracle. It is important to point out that the precise operating systems and hardware configurations of third party Web page server 108, referring page Web server 106, end-user system 112 and billing system 102 are not limited to any specific hardware or software configuration. Third party Web server 108 and referring page Web server 106 are a network servers such as Sun Sparc Server, IBM's PC Server, IBM AS/400, IBM ES/9000 or equivalent server hardware platforms capable of hosting Web applications. End-user systems 112 can be a personal computer or any other information processing apparatus suitable for communicating with the Web.

Figures 2, 3:
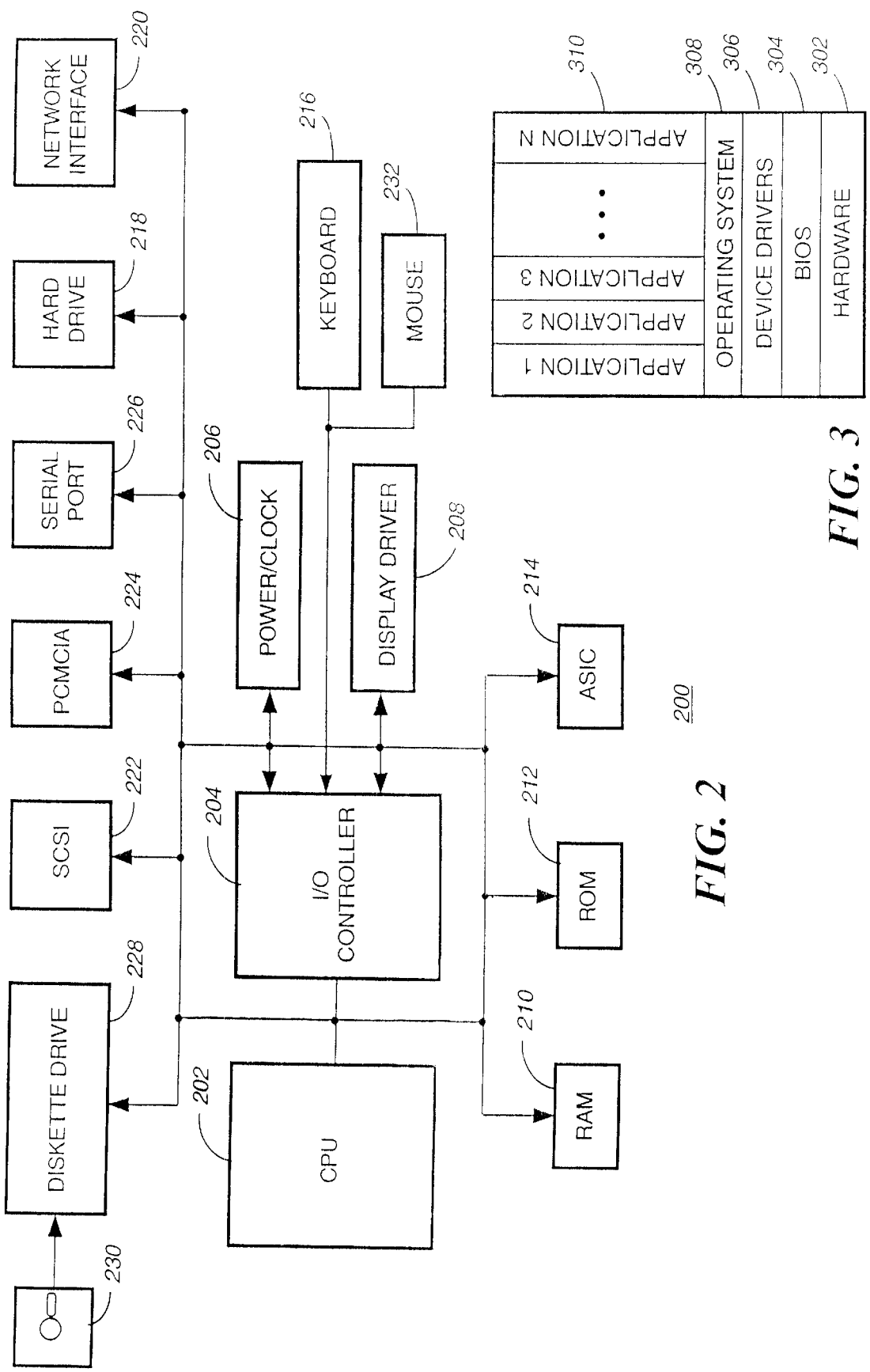
FIG. 2 is a block diagram of the major electrical components of an information processing system as used in FIG. 1 according to the present invention.
FIG. 3 is a block diagram illustrating the software hierarchy for the information processing device of FIG. 2 according to the present invention.

Referring to FIG. 2, there is shown a block diagram of the major electrical components of a computer system 200 used in accordance with this invention. The computer system is an example embodiment of the hardware system for any or all of the components of FIG. 1: third party web page server 108, referring page Web server 106, billing system 102 and end-user systems 112. The electrical components include: a central processing unit (CPU) 202, an Input/Output (I/O) Controller 204, a system power and clock source 206; display driver 208; RAM 210; ROM 212; ASIC (application specific integrated circuit) 214 and a hard disk drive 218. A keyboard 216 with a mouse 232 receives the user input. These are representative components of a computer. The operation of a computer comprising these elements is well understood. Network interface 220 provides connection to a computer network such as Ethernet, TCP/IP or other popular protocol network interfaces. Optional components for interfacing to external peripherals include: a Small Computer Systems Interface (SCSI) port 222 for attaching peripherals; a PCMCIA slot 224; and serial port 226. An optional diskette drive 228 is shown for loading or saving code to removable diskettes 230 or equivalent computer readable media such as CD-ROM, removable storage medium and optical character scanning. The system 200 may be implemented by combination of hardware and software. Moreover, the functionality required for using the invention may be embodied in computer-readable media (such as 3.5 inch diskette 230) to be used in programming an information-processing apparatus (e.g., a personal computer) to perform in accordance with the invention.

FIG. 3 is a block diagram illustrating the software hierarchy for the information processing system of FIG. 2 according to the present invention. The hardware 302 is the information processing system of FIG. 2. BIOS (Basic Input Output System) 304 is a set of low level of computer hardware instructions, usually stored in ROM 212, for communications between an operating system 308, device driver(s) 306 and hardware 302. Device drivers 306 are hardware specific code used to communicate between and operating system 308 and hardware peripherals such as a mouse 232, CD ROM drive or printer. Applications 310 are software application written in C/C++, Java, assembler or equivalent. Example software applications implemented in the present invention such as the referring page Web server 106, a usage collector 402 are described in greater detail below. Operating system 308 is the master program that loads after BIOS 304 initializes, that controls and runs the hardware 302. Examples of operating systems include DOS, Windows 3.1/95/98/NT, Unix, Macintosh, OS/2 and equivalent.

Figure 4:
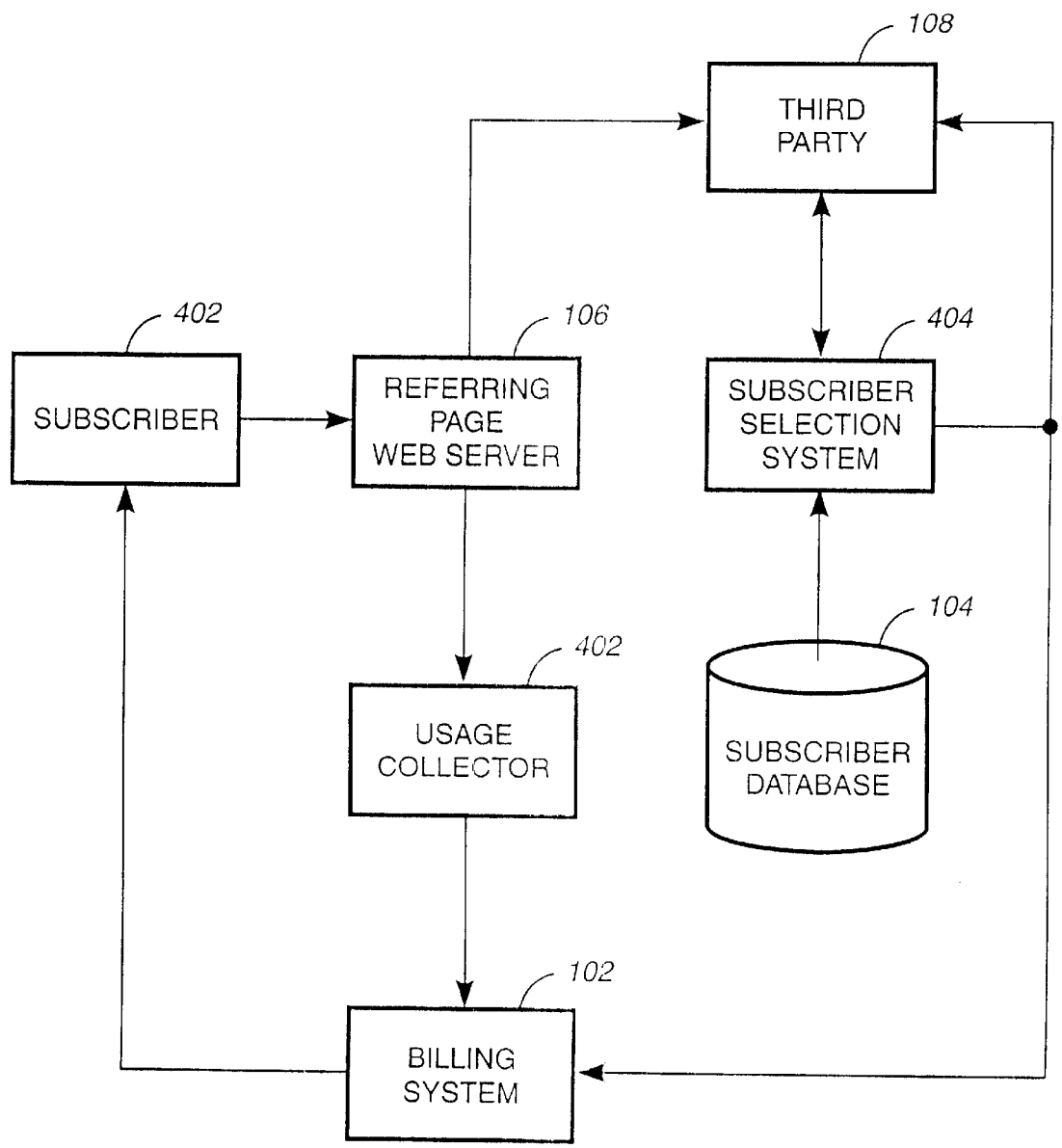
FIG. 4 is a functional block diagram of the system for providing a message from a third party to a select group of subscribers in a billing system according to the present invention.

Turning now to FIG. 4 is a functional block diagram of the system 400 for providing a message from a third party to a selected group of subscribers in a billing system according to the present invention. There are seven major components in this flow: (i) subscriber client or end-user systems 112; (ii) referring page Web server 106; (iii) billing system 102; (iv) subscriber database 104; (v) third party provider 108; (vi) usage collector 402; and (vii) subscriber selection system 404. The subscriber 402 is the user or end-suer of a service that is being billed by billing system 102. In this embodiment, the bill is sent over the network, such as the Internet 110, electronically. The subscriber receives the bill on end-user system 112. It is important to note, that even though the subscriber in this embodiment is billed electronically it should be understood that bills can be mailed via private and federal postal services. The subscriber information database 104 is used by the third party 108 to direct messages from third parties. The subscriber information database 104 is a relational, object-oriented database, or any other database that has sophisticated query capability. The information stored in the subscriber information database includes both subscriber information and subscriber preferences. The subscriber database provides finely tuned subscriber selection based on such categories: name, address, telephone number, e-mail address, county, taxing jurisdiction, terms and conditions of the service, house-hold income, household size, service subscription history, service usage information, race, education, employment, and more and other information valuable to third party providers of messages.

The subscriber selection system 404 is a database management system application 310 for performing queries against predefined subscriber criteria stored in the subscriber database 104. Typically, the subscriber selection system 404 presents a user interface to an administrator of the billing systems. In another embodiment, the interface may be provided to the third parties themselves. The user interface can be used by the administrator to gather a set of criteria as specified by a third party 108 for selecting all subscribers who satisfy the criteria. This user interface can also be used by the administrator to pass a message from the third party 108 in addition to the criteria. The message is passed or delivered by the billing system 102 to any subscriber 402 that satisfy the criteria. The subscriber selection system can be configured so that the message will also be automatically delivered to all of the future subscribers of billing system 102 who would satisfy the same criteria.

In another embodiment, billing system 102 personalizes any included messages to the subscriber PCs 112. This personalization can include any of the subscribers information such as name or any of the subscriber's preferences desired by the third party 108. In another embodiment, for an electronic message over the Internet, an URL (Uniform Resource Locator) or equivalent address is attached to the message so that any requests made by the recipient subscriber will be directed to referring page Web server 106.

The referring page Web server 106 in the electronic message embodiment has an application 310 that receives requests from any of the subscribers 402 and redirects the request by inserting the appropriate address of the third party 108 in its place. The referring page Web server 106, in addition, to receiving and changing the address, such as the URL address. the referring page Web server 106 updates the subscriber database 104 that the particular subscriber has responded to the message from the third party 108. The usage collector 402 collects the usage information for the referring page Web server 106. The usage collector 402 sends the usage information to the billing system 102.

Figure 5A:
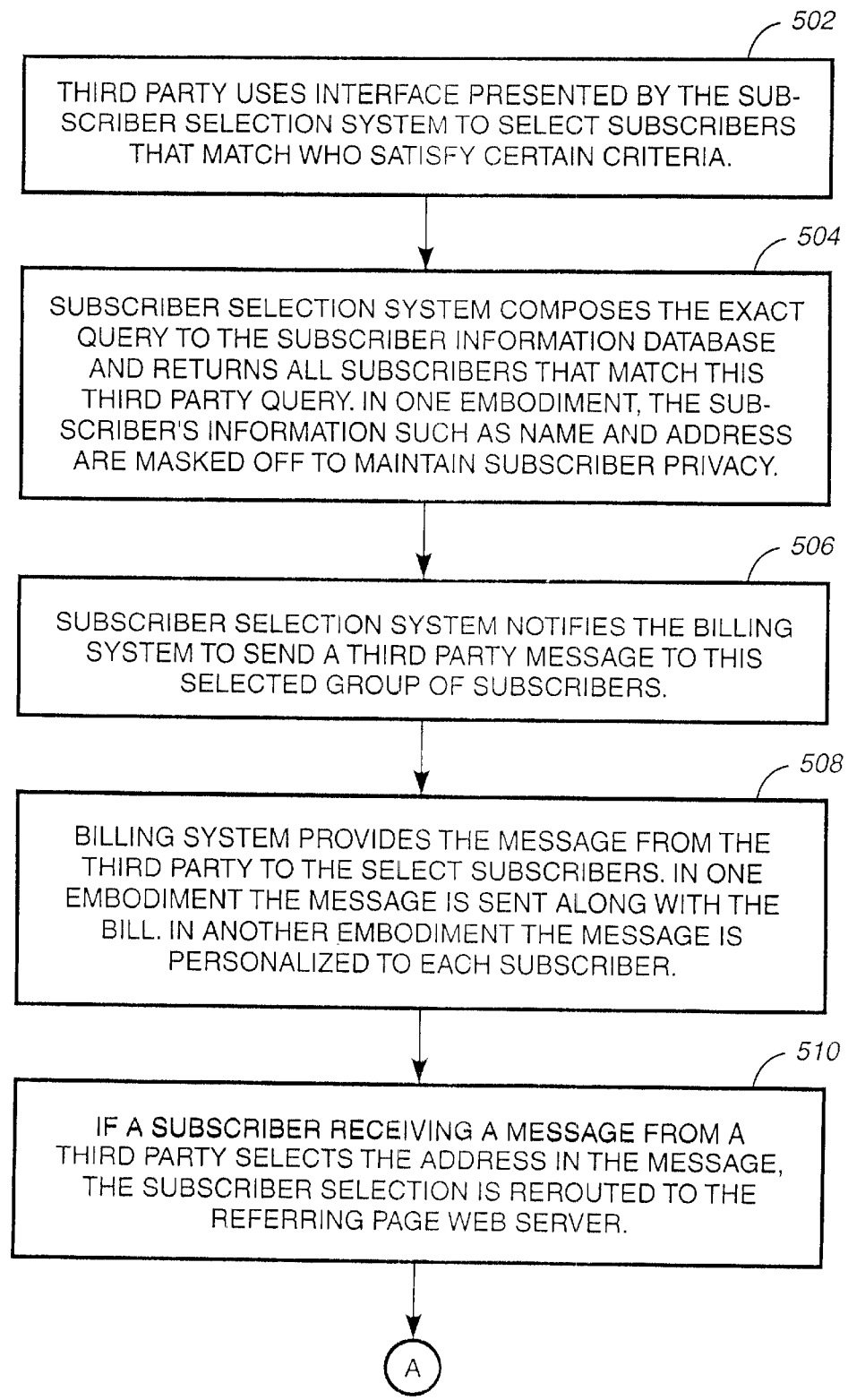
FIG. 5 is the corresponding process flow for FIG. 4 according to the present invention.
Figure 5B:
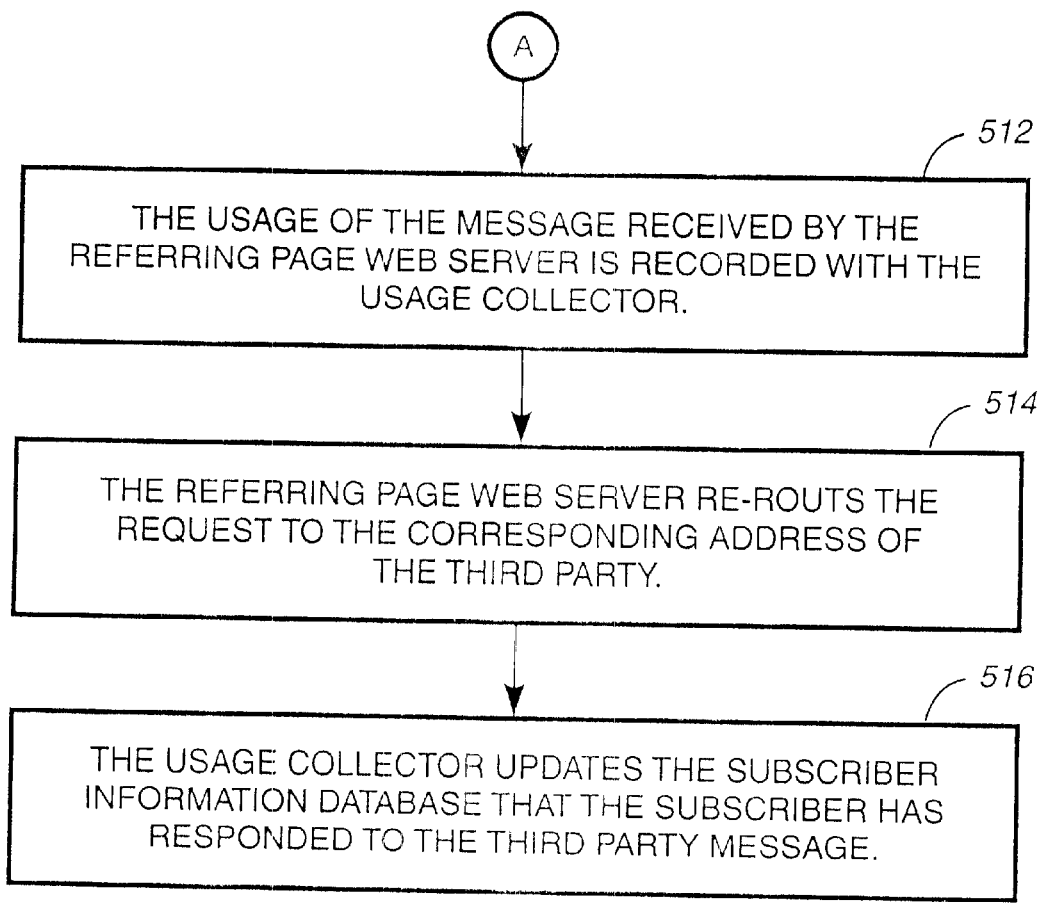

FIG. 5 illustrates the corresponding process flow for FIG. 4 is now described according to the present invention. Subscriber information and preferences are collected at the subscriber creation and is also extracted from the subscriber's ongoing usage data. In step 502, the third party 108 uses the interface presented by the subscriber selection system 404 to select subscribers 402 who satisfy certain criteria. Step 504, the subscribe selection system 404 composes the exact query to the subscriber information database 104 and selects all subscribers who match the selection criteria. In this embodiment, the subscriber selection system 404 returns the selection result from step 504 and masks off the subscribers' names and addresses so that their privacy is maintained to the third party 108. In other embodiments the subscriber selection system 404 may not return results directly to the third party 108 but rather the results are to the administrator of the billing system 102. The administrator formats the search results and masks off subscriber sensitive information shared to the third party 108 as needed. Based on the selection result, the third party 108 chooses to send a targeted message to this group of selected subscribers. Next in step 506, the subscriber selection system 404 notifies the billing system 102 about this request so that the third party message is re-routed to the selected group of subscribers. In another embodiment, the message is included along with the next bill to this select subscriber group. Step 508, the billing system 102 includes the third party message. In another embodiment, a personalized header is added to the message from the subscriber information and preferences. The personalized header will make the message friendlier, more attractive and powerful.

In step 510, if the subscriber 402 selects the message such as clicking on the address or URL link, the selection is re-routed to the referring page Web server 106. The usage of the message received by the referring page Web server 106 is recorded with the usage collector 402. The usage collector 402 records the usage information such as the subscriber ID, the date and time, the ID of the third party 108, an ID for the message and more.

Step 512, the usage information recorded is passed to the usage collector 402 and in step 514 the subscriber request is re-routed to the third party 108. The usage collector 402 updates the subscriber information database using standard inference rules with the fact that this subscriber is interested in that advertising message, step 516.

In another embodiment, the billing system 102 bills the third party 108 for access to the subscriber information database 104 and charges the third party 108 for each "hit" or selection made by the subscribers who receive the message. This usage based billing is one of several billing methods contemplated including flat rate billing rate and access billing rates.

Figure 6:
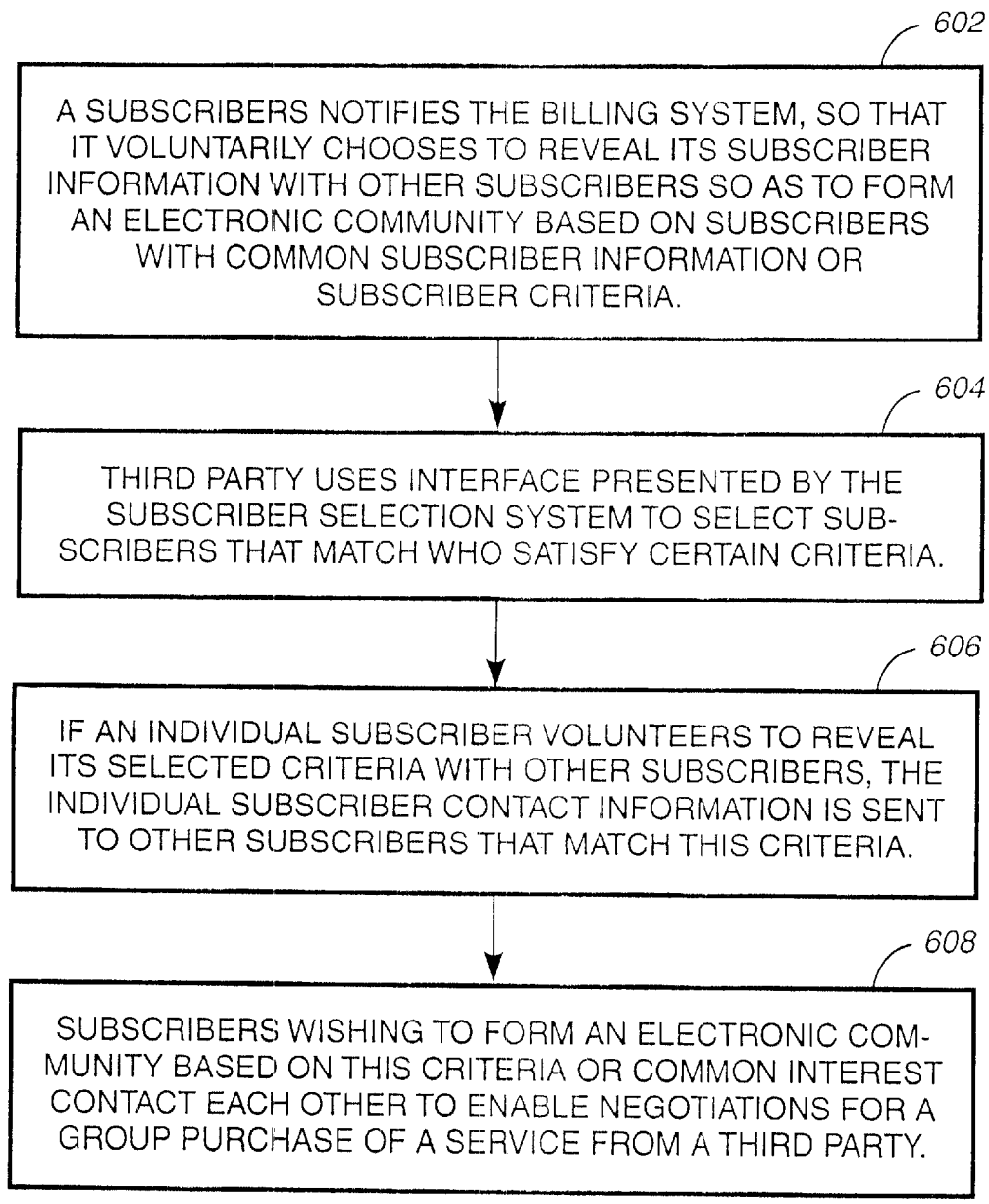
FIG. 6 is the process flow for forming an electronic community for group purchasing according to the present invention.

FIG. 6 is the process flow for forming an electronic community for group purchasing according to the present invention. The subscribers wishing to form an online community can notify the billing system 102 of their desire to be known to other subscribers that meet some similar or identical selection criteria in the subscriber selection system, step 602. This notification can be via E-mail using forums, chats, gaming, via telephone or via regular U.S. mail. By volunteering to be part of a community of subscribers with similar profiles, the privacy of each subscriber is not involuntarily compromised. As described above for step 502, the third party 108 uses the interface presented by the subscriber selection system 404 to select subscribers who satisfy certain criteria, step 604. In step 606, contact information for any individual subscriber is sent to the select group of subscribers that wish to reveal their subscriber information with other subscribers so as to form an electronic community base on the subscribers with common criteria. This contact information can be a simple E-mail address, postal address, telephone number or some other contact information that is sent along or communicated to each subscriber from step 604 above using E-mail, telephone or regular U.S. mail. In one embodiment, this contact information is sent along with the bill. Once a community is formed of two or more subscribers with common interests, these subscribers can then contact the third party 108 of their desires to be treated as a group. This group concept is very powerful in that it lets subscribers in a community negotiate group purchases from a third party. For example, if the third party 108 is an automobile dealer wishing to target a specific group of subscribers through the subscriber selection system 404 as described in FIG. 5 above, a message including an automobile advertisement is sent along with the subscriber's bill. Since two or more of the subscribers have formed a community based on some selection criteria, for example luxury sport utility vehicles, each subscriber in the voluntary community can collaborate to negotiate a group purchase. This ability to group prospective purchasers is very powerful because subscribers in the community can negotiate a volume discount with the third party. Contrasted with subscribers without this community, where the subscribers would have to negotiate separately. Stated differently, five people offering a group price for a particular item such as a luxury sport utility vehicle, have more bargaining power than five separate individuals alone. In addition, the sellers of the automobile, do not have to negotiate with five separate persons and enjoy lower sales cost to sell each vehicle.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A system for distributing messages from a third-party for forming a community of subscribers for a group purchase, the system comprising:

an interface to a database for storing subscriber information for one or more subscribers;

a subscriber selection system using one or more subscriber criteria for querying the database for storing subscriber information, so as to form a group of one or more subscribers with subscriber information that matches the subscriber criteria, wherein the subscriber criteria are chosen by a third party such that the group of one or more subscribers satisfies the subscriber criteria for a type of subscriber who the third party wants to send one or more messages to;

a billing system coupled to the database for providing bills to one or more subscribers, wherein the billing system is capable of receiving one or more messages from the third party and providing the one or more messages to the subscribers as selected by the subscriber selection system, without revealing to the third party any of the subscriber information in the database so that the privacy of the subscriber information is maintained and not sent to the third party, wherein the one or more messages includes at least one contact address;

a usage collector coupled to the database for receiving a reply at the contact address from any of the subscribers in the group wishing to form a community by providing contact information to other subscribers; and means for notifying the subscribers that form the community so that each of the subscribers in the community can contact at least one other subscriber in the community to negotiate a group purchase from the third party.

2. The system according to claim 1, wherein the contact address is one of an e-mail address, a telephone number and a postal address.

3. The system according to claim 2, wherein the means for notifying the subscribers that form tho community so that each of the subscribers in the community can contact at least one other subscriber in the community to negotiate a group purchase of a good and/or a service from the third party.

4. The system according to claim 2, wherein a bill is sent electronically with the contact address to the group of subscribers.

5. The system according to claim 2, wherein the hill is printed and the contact address is mailed along with the bill to the group of subscribers.

6. The system according to claim 1, wherein the subscriber selection system provides the total number of matches to the database that meet the criteria of the query for subscriber information.

7. The system according to claim 4, wherein the contact address is embedded as an electronic address in the bill so that the contact address is selectable by one or more subscribers so as to form the community; and wherein the usage collector updates the database for each subscriber based on the contact address selected by the subscriber.

8. The system according to claim 7, further comprising:

an address redirector for rerouting the contact address selected by the subscriber to the third party.

9. The system according to claim 1, wherein the bill is sent for a service billed by the billing system which is not a service available from the third party that provides the one or messages to the group of subscribers.

10. The system according to claim 9 wherein the database holds subscriber preferences for one or more subscribers, and the subscriber selection system is capable of querying the database for subscriber preferences relating to one or more subscribers.

11. The system according to claim 10, wherein the billing system provides one or more messages to subscribers along with a bill.

12. The system according to claim 11, wherein the bill is sent electronically to one or more subscribers.

13. The system according to claim 11, wherein the bill is printed and the message mailed along with the bill.

14. The system according to claim 10, wherein the subscriber selection system provides a total number of matches to the database that meet the criteria of the query for subscriber preferences.

15. The system according to claim 12, wherein the contact address is an electronic address embedded in the bill so that the address is selectable by one or more subscribers so as to form the community; and wherein the usage collector updates the database for each subscriber based on the contact address selected by the subscriber.

16. The system according to claim 15, further comprising:

an address redirector for rerouting the contact address selected by the subscriber to the third party.

17. The system according to claim 1, wherein a bill is sent for a service billed by the billing system which is not a service available from the third party that provides the one or messages to the group of subscribers.

18. A method for distributing messages from a third-party for forming a community of subscribers for a group purchase, the method comprising the steps of:

storing subscriber information for one or more subscribers in a database;

querying the database using a subscriber selection system that uses one or more subscriber criteria to form a group of one or more subscribers, wherein the subscriber criteria are chosen by a third party such that the group of one or more subscribers formed satisfies the subscriber criteria for a type of subscriber who the third party wants to send one or more messages to; and coupling a billing system to the database for providing bills to one or more subscribers;

receiving one or more messages from the third party to the billing system; and providing one or more messages to the subscribers as selected by the subscriber selection system, without revealing to the third party any of the subscriber information in the database so that the privacy of the subscriber information is maintained and not sent to the third party, wherein the one or more messages includes at least one contact address;

coupling a usage collector to the database for receiving a reply at the contact address from any of the subscribers in the group wishing to form a community by providing contact information to other subscribers; and notifying the subscribers that form tho community so that each of the subscribers in the community can contact at least one other subscriber in the community to negotiate a group purchase from the third party.

19. The method according to claim 18, wherein the step of providing further comprises providing the contact address as one of an e-mail address, a telephone number and a postal address.

20. The method according to claim 19, wherein the step of notifying further comprises:

noting the subscribers that form the community so that each of the subscribers in the community can contact at least one other subscriber in the community to negotiate a group purchase of a good and/or a service from the third party.

21. The method according to claim 19, wherein the step of providing further comprises sending electronically a bill with the contact address to the group of subscribers.

22. The method according to claim 19, wherein the step of providing further comprises printing the bill and mailing the contact address along with the bill to the group of subscribers.

23. The method according to claim 18, wherein the step of querying further comprises the sub step of:

providing a total number of matches to the database that meet the criteria of the query for subscriber information.

24. The method according to claim 21, further comprising the steps of:
embedding the contact address in the bill so that the contact address is selectable by one or more subscribers so as to form the community;
wherein the usage collector receives subscriber selections; and updates the database for each subscriber based on the contact address selected by the subscriber.

25. The method according to claim 24, further comprising the step of:
redirecting the address through an address redirector for rerouting the contact address selected by the subscriber to the third party.

26. The method according to claim 18, wherein the step of storing further comprises storing subscriber preferences for one or more subscribers in the database; and the step of querying further comprises querying the subscriber selection system the database for subscriber preference relating to one or more subscribers.

27. The method according to claim 26, wherein the step of providing further comprises providing the bill is sent for a service billed by the billing system which is not a service available from the third party that provides the one or messages to the group of subscribers.

28. The method according to claim 27, wherein the step of providing further comprises providing one or more messages to subscribers electronically.

29. The method according to claim 27, wherein the step of providing further comprises providing one or more messages to subscribers in a printed form and mailing the message along with the bill.

30. The method according to claim 26, wherein the step of providing further comprises providing a total number of matches to the database that meet the criteria of the query for subscriber preferences.

31. The method according to claim 29, further comprises the steps of:
embedding the contact address in the bill so that the contact address is selectable by one or more subscribers so as to form the community;
wherein the usage collector receives subscriber selections; and updates the database for each subscriber based on the contact address selected by the subscriber.

32. The method according to claim 31, further comprising the step of:
redirecting an address through an address redirector for rerouting the contact address selected by the subscriber to the third party.

33. The method according to claim 18, further comprising the step of:
sending a bill for a service billed by the billing system which is not a service available from the third party that provides the one or messages to the group of subscribers.

34. A computer readable medium containing program instructions for distributing messages from a third-party for forming a community of subscribers for a group purchase, comprising the instructions of:
storing subscriber information for one or more subscribers in a database;
querying the database using a subscriber selection system that uses one or more subscriber criteria to form a group of one or more subscribers, wherein the subscriber criteria are chosen by a third party such that the group of one or more subscribers formed satisfies the subscriber criteria for a type of subscriber who the third party wants to send one or more messages to; and
coupling a billing system to the database for providing bills to one or more subscribers;
receiving one or more messages from the third party to the billing system; and
providing one or more messages to the subscribers as selected by the subscriber selection system, without revealing to the th party any of the subscriber information in the database so that the privacy of the subscriber information is maintained and not sent to the third party, wherein the one or more messages includes at least one contact address sent to one or more subscribers in the group;
coupling a usage collector to the database for receiving a reply at the contact address from any of the subscribers in the group wishing to form a community by providing contact information to other subscribers; and
notifying the subscribers that form the community so that each of the subscribers in the community can contact at least one other subscriber in the community to negotiate a group purchase from the third party.

35. The computer readable medium according to claim 34, wherein the instruction of providing further comprises providing the contact address as one of an e-mail address, a telephone number and a postal address.

36. The computer readable medium according to claim 35, wherein the instruction of notifying further comprises:
notifying the subscribers that form the community so that each of the subscribers in the community can contact at least one other subscriber in the community to negotiate a group purchase of a good and/or a service from tho third party.

37. The computer readable medium according to claim 35, wherein the instruction of providing further comprises sending electronically a bill with the contact address to the group of subscribers.

38. The computer readable medium according to claim 35, wherein instruction of providing further comprises printing the bill and mailing the contact address along with the bill to the group of subscribers.

39. The computer readable medium according to claim 34, wherein the instruction of querying further comprises the sub-instruction of:
providing a total number of matches to the database that meet the criteria of the query for subscriber information.

40. The computer readable medium according to claim 37, further comprising the instructions of:
embedding the contact address in the bill so that the contact address is selectable by one or more subscribers so as to form the community;
wherein the usage collector receives subscriber selections; and updates the database for each subscriber based on the contact address selected by the subscriber.

41. The computer readable medium according to claim 40, further comprising the instruction of:
redirecting the address through an address redirector for rerouting the contact address selected by tho subscriber to the third party.

42. The computer readable medium according to claim 35, wherein the instruction of storing further comprises storing subscriber preferences for one or more subscribers in the database; and the instruction of querying further comprises querying the subscriber selection system the database for subscriber preference relating to one or more subscribers.

43. The computer readable medium according to claim 42, wherein the instruction of providing further comprises providing the bill is sent for a service billed by the billing system which is not a service available from the third party that provides the one or messages to the group of subscribers.

44. The computer readable medium according to clam 43, wherein the instruction of providing further comprises is providing one or more messages to subscribers electronically.

45. The computer readable medium according to claim 43, wherein the instruction of providing further comprises providing one or more messages to subscribers in a printed form and mailing the message along with the bill.

46. The computer readable medium according to claim 42, wherein the instruction of providing further comprises providing a total number of matches to the database that meet the criteria of the query for subscriber preferences.

47. The computer readable medium according to claim 45, further comprises the instructions of:
embedding the contact address in the bill so that the contact address is selectable by one or more subscribers so as to form the conunlinity;
wherein the usage collector receives subscriber selections; and updates the database for each subscriber based on the contact address selected by the subscriber.

48. The computer readable medium according to claim 47, further comprising the instruction of:
redirecting an address through an address redirector for rerouting the contact address selected by the subscriber to the third party.

49. 1the computer readable medium according to claim 34, further comprising the instruction of:
sending a bill for a service billed by the billing system which is not a service available from the third party that provides the one or messages to the group of subscribers.

50. The system according to claim 1, wherein the message is an advertisement from the third party.

51. The system according to claim 1, wherein the third-party selects subscriber criteria from a group of subscriber criteria consisting of age, gender, zip code, house-hold income, employment, and education.

52. The system according to claim 1, wherein the billing system does not reveal to the third-party subscriber information consisting of name, address, telephone number, and social security number.

* * * * *

UNITED STATES PATENT AND TRADEMARK OFFICE
CERTIFICATE OF CORRECTION

PATENT NO. : 6,493,722 B1
DATED : December 10, 2002
INVENTOR(S) : James Daleen et al.

It is certified that error appears in the above-identified patent and that said Letters Patent is hereby corrected as shown below:

<u>Title page,</u>
Item [57], ABSTRACT,
Line 14, change ", to. A" to -- to a --
Line 15, change "database" to -- database, --
Line 24, change "subscriber" to -- subscribers --
Line 27, change "pup" to -- group --

<u>Column 3,</u>
Line 11, change "part" to -- party --
Delete lines 19 through 29

<u>Column 9,</u>
Line 25, change "tho" to -- the --
Line 52, change "or messages" to -- or more messages --

<u>Column 10,</u>
Line 42, change "tho" to -- the --

<u>Column 12,</u>
Line 11, change "th" to -- the --
Lines 35 and 61, change "tho" to -- the --
Line 41, change "wherein" to -- wherein the --

<u>Column 13,</u>
Line 26, change "conunlinity" to -- community --

UNITED STATES PATENT AND TRADEMARK OFFICE
CERTIFICATE OF CORRECTION

PATENT NO.    : 6,493,722 B1
DATED         : December 10, 2002
INVENTOR(S)   : James Daleen et al.

It is certified that error appears in the above-identified patent and that said Letters Patent is hereby corrected as shown below:

<u>Column 14,</u>
Line 9, change "1the" to -- The --
Line 13, change "or messages" to -- or more messages --

Signed and Sealed this

Fifteenth Day of April, 2003

JAMES E. ROGAN
*Director of the United States Patent and Trademark Office*